United States Patent Office 3,547,650
Patented Dec. 15, 1970

3,547,650
SILVER HALIDE EMULSION COMPRISING A GELATIN - POLYVINYL COMPOUND DISPERSION
Jack Pilato, Iselin, N.J., assignor to E. I. du Pont de Nemours and Company, Wilmington, Del., a corporation of Delaware
No Drawing. Filed Nov. 13, 1967, Ser. No. 682,495
Int. Cl. G03c 1/04
U.S. Cl. 96—114
3 Claims

ABSTRACT OF THE DISCLOSURE

Graphic arts silver halide photographic emulsion layers wherein the binding material for the grains comprises a mixture of gelatin and an aqueous dispersion of a polymeric vinyl compound polymerized in the presence of a mixture of alkylphenyloxyethoxyphosphates and alkyl phosphates and an azo initiator.

SUMMARY OF THE INVENTION

The photographic silver halide emulsions and emulsion layers of this invention have as the binding material for the silver halide grains a mixture of gelatin and a dispersed polymerized vinyl compound dispersed with a mixture of organic phosphates, said mixture comprising, by weight, 100% to 85% of

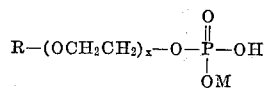

and 0 to 15% of

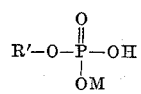

wherein R=a branched chain nonylphenyl group, $x$=an integer no greater than 6, R' is an alkyl radical of 10 to 12 carbon atoms and M is hydrogen, alkali metal (e.g., Na- or K) or ammonium and a free-radical azo addition polymerization initiator, including those disclosed in Hunt U.S. 2,471,959, May 31, 1949, preferably $\alpha,\alpha'$-azobis-(isobutyronitrile). The dispersed polymeric vinyl compound can be made by polymerizing an aqueous solution the vinyl monomer, mixture of organic phosphates and initiator. The resulting aqueous dispersion of the polymer is then uniformly admixed with the aqueous silver halide dispersion or emulsion which is then coated to form a layer on a suitable support.

The preferred polymeric vinyl compound is an acrylic acid ester taken from the group consisting of a homopolymer of an acrylic acid ester, a homopolymer of an $\alpha$-hydrocarbon substituted acrylic acid ester and a copolymer of said acrylic acid esters, said copolymer containing at least 90% by weight of units of said acrylic acid esters. This compound in the form of a hydrosol or colloidal dispersion is preferably dispersed with the aqueous silver halide gelatin emulsion by means of at least one mixture of the surfactants described above.

The polymer dispersions using sodium dodecyl sulfate formed in the manner described above are very susceptible to temperatures above 20° C. and coagulation occurs when stored for periods of time before being incorporated in the gelatino-silver halide emulsions. This makes them unusable and they must be discarded resulting in costly waste.

The polymer dispersions using alkyliminodicarboxylates, on the other hand are quite susceptible to pH changes. As the pH of the dispersion decreases due to hydrolysis of the polymeric ester coagulation occurs.

The so-formed dispersions cannot be used successfully with all types of graphic arts emulsions. In some emulsions, the polymer dispersions formed using alkyliminodicarboxylates at surfactants tend to cause haze, and surface characteristics which are detrimental to retouching-dye removal.

The use of hydrogen peroxide as a catalyst also tends to desensitize and fog some optically sensitized emulsions.

The use of sodium dodecyl sulfate as the surfactant and ammonium persulfate as the initiator also tends to desensitize optically sensitized emulsion such as panchromatic separation films. Further, the sodium dodecyl sulfate tends to interact with gelatin at low pH and causes coagulation or enlarging of the latex particles in the emulsion.

Sodium dodecyl sulfate is used in some cases to increase the sensitivity of lithographic emulsions. Polymer dispersions using alkyliminodicarboxylate surfactants cannot be used with these emulsions in certain ratios because excessive haze develops due to the interaction of the two compounds.

BACKGROUND OF THE INVENTION

Field of the invention

This invention relates to photographic silver halide emulsions. More particularly it relates to improved emulsion layers for graphic arts photographic films. Still more particularly this invention relates to improved gelatin emulsion layers containing improved dispersions of vinyl polymer latices.

Description of the prior art

Light-sensitive emulsion layers used by the graphic arts industry for the production of printing plates must meet very high standards for physical, dimensional and photographic properties. Existing emulsion layers, however, only partially meet these requirements. Recently, improved photographic films have been developed wherein the binder material for the silver halide grains comprises a mixture of gelatin and an aqueous dispersion of a polymeric vinyl compound, said vinyl compound being polymerized by means of hydrogen peroxide as an initiator in an aqueous dispersion and introduced in the silver halide emulsion by means of at least one amphoteric alkyliminodicarboxylate surfactant wherein the alkyl group contains 12–18 carbon atoms. The vinyl compound may also be polymerized using ammonium persulfate, an organic peroxide of an azo compound as an initiator and sodium dodecyl sulfate as a surfactant. The incorporation of the above described polymer latex dispersions in emulsions provide films having greatly improved dimensional stability, improved flexibility, impact resistance and anchorage.

However, the above polymer lactices have a number of objectionable features that are detrimental to the polymer dispersions per se and their effect on some of the sensitometric characteristics of the emulsions in which they are incorporated has other disadvantages.

An aqueous gelatino-silver emulsion for graphic arts use is prepared, sensitized and digested in a manner familiar to those skilled in the art. After digestion, but prior to coating, there is added to the emulsion an aqueous dispersion of the polymerized vinyl compound prepared as described above.

DESCRIPTION OF THE PREFERRED EMBODIMENT

In a preferred embodiment of this invention, an aqueous gelatino-silver halide emulsion is prepared containing for each mole of silver halide, 40 to 180 grams of gelatin, from 10 to 90 grams of acrylic acid ester polymer prepared as described above and based on the initial weight of monomer in the polymerization reaction mixture. There are then admixed various conventional adjuvants such as a sulfur sensitizer, a metal sensitizer, an antifogging agent and a hardener. The emulsion is coated to form an emulsion layer on a suitable support such as a cellulose ester or polyester photographic film base. The coating is dried and exposed sensitometrically through a neutral density wedge, processed by developing, fixing, etc. and the image densities read on a conventional type of densitometer to give the results as shown in the tables accompanying the examples. The coatings were also evaluated for their humidity coefficient of expansion (cm. change per cm. of film length per 1% change in relative humidity) and for their dimensional stability, processing size change in cm. change per cm. of film length when put through a conventional processing cycle, including redrying. The dimensional stability and humidity coefficient of expansion are essentially equivalent to those of commercially practical coatings containing polymer latices made in the manner described in Nottorf, U.S. 3,142,568.

The invention will be further illustrated by but is not intended to be limited to the following procedures and examples. Emulsion layers comprising mixtures of gelatin and aqueous dispersions of polymer latices prepared using the phosphate ester surfactants describing above and azo-bis-isobutyramidine hydrochloride are compared with emulsion layers comprising mixtures of gelatin and aqueous dispersions of polymer latices prepared using sodium dodecyl sulfate as a surfactant and ammonium persulfate as an initiator, and where disodium-N-tallow-$\beta$-iminodipropionate was used as a surfactant and hydrogen peroxide as an initiator.

PROCEDURE FOR MAKING THE POLYMER DISPERSIONS

A two-liter, three-necked round bottom flask was equipped with a thermometer, anchor stirrer, a water-jacketed reflux condenser, a dropping funnel with a flow tube and a gas inlet tube and placed on a water bath. Water (600 grams) was placed in the flask and the stirrer adjusted so the water had a definite motion without being violent (splashing on the sides). To this was added 105 grams of a 528 gram quantity of ethyl acrylate and 20 grams of a surfactant composed as follows:

|  | Percent |
| --- | --- |
| Branch chain nonylphenyl $(OCH_2CH_2)_{4-6}$—O—$\overset{\overset{O}{\|}}{\underset{\underset{OH}{\|}}{P}}$—OH | 85 |
| $C_{10-12}H_{21-25}$—O—$\overset{\overset{O}{\|}}{\underset{\underset{OH}{\|}}{P}}$—OH | 15 | in 110 grams of water containing 1.28 grams of sodium hydroxide. 2 grams of azo-bis-isobutyramidine hydrochloride was dissolved in 70 grams of water and added to the mixture. Nitrogen was lead through the inlet hose over the reactants and a positive pressure of nitrogen gas was maintained during the reaction. The temperature of the water bath was raised to 80° C. When the reaction mixture reached 52° C. the water bath temperature was lowered to 60° C. The reaction started between 53–59° C. and the temperature of the reaction rose to 72–74° C. The rest of the ethyl acrylate monomer, 420 grams, (the monomer contained 15 p.p.m. of methoxyhydroquinone as an inhibitor) was then added via the dropping funnel at the rate of 6 ml./minute. This took approximately 70 minutes and maintained a 10–12° C. differential between the water bath and the reaction mixture. After the completion of the addition of ethyl acrylate, the temperature of the reaction mixture was maintained at 72° C. for an additional 30 minutes. At the end of this time the product which is an aqueous dispersion containing about 40.0% solids was cooled to room temperature and was then ready for storage or incorporation into a photographic emulsion.

Samples of the above dispersion were stored for a period of one year without any indication of coagulation. A sample of the dispersion was sealed in a bottle and placed in an oven at 125° F. for a period of one week with a sample which was made using sodium dodecyl sulfate as a surfactant and ammonium persulfate as an initiator. The former sample showed no indication of coagulation while the latter coagulated to a solid rubbery mass.

To 100 gram samples of the dispersion there was added 50 ml. of 0.006 N hydrochloric acid. This amount was also added to a similar sample of a dispersion made using disodium-N-tallow-$\beta$-iminodipropionate as the surfactant and hydrogen peroxide as an initiator. The former dispersion showed no tendency to coagulate even though the pH was reduced from 7.3 to 3.3. The latter dispersion showed considerable coagulation as the pH approached 5.6. This characteristic of remaining dispersed at around a pH of 5 to 6 is important because many photographic emulsions are coated at pH's in this range and also many photographic gelatins have isoelectric points in this range.

In the following examples two polymeric latices were used as controls for showing the beneficial effects of using polymeric latex made according to the procedure above.

The latex made with an ammonium persulfate initiator and sodium dodecyl sulfate surfactant is designated Polymer latex (A) and the latex made according to Procedure A of Nottorf U.S. 3,142,568 using hydrogen peroxide and disodium-N-tallow-$\beta$-iminodipropionate is designated Polymer latex (B).

Example I.—A graphic arts emulsion suitable for continuous-tone work having a silver halide composition of 97 mole percent silver bromide and 3 mole percent of silver iodide and having 14 grams of gelatin present per mode of silver halide for the steps of precipitation was prepared. The emulsion was ripened and freed of unwanted, soluble, by-product salts by the coagulation and washing procedure described in Moede, U.S. Pat. 2,772,165 wherein the silver halide and most of the gelatin were coagulated by the o-sulfobenzaldehyde polyvinyl acetal, using an acid coagulation environment. Following the washing step, the emulsion coagulate was redispersed in water together with 126 grams of additional bulking gelatin. The redispersed emulsion was treated with a conventional sulfur sensitizer and digested at 63° C. to increase sensitivity, was cooled to a holding temperature of about 38° C. and treated with conventional post-sensitization additives and stabilizers such as additional halide, antifogging agent, etc., as is common in the art. The emulsion was divided into two equal portions and to one portion there was added, per mole of silver halide, 67 grams of the polymeric latex made up as a dispersion according to the above Procedure for Making the Polymer Dispersions and to the other portion there was added, per mole of silver halide, 67 grams of the Polymer latex (A) made as a dispersion according to Procedure A in Nottorf, U.S. Pat. 3,142,568. The emulsions thus prepared were coated on polyethylene terephthalate photographic film base of the type described in Alles et al. U.S. Pat. 2,779,684. The coating provided a silver halide coating weight equivalent to about 110 milligrams as silver bromide per square decimeter when dry. Samples of the coatings were given a conventional sensitometric exposure and developed in a conventional developer. The samples were equivalent in speed and contrast. The control sample using the Polymer latex (B) showed poor retouching-dye removal while the sample containing the phosphate ester of this invention substantially eliminated this deficiency.

Example II.—A lithographic silver chlorobromide emulsion suitable for halftone work was made having a silver halide composition of 30 mole percent silver bromide and 70 mole percent silver chloride having 20 grams per mole of silver halide was made, washed, and treated substantially as described in Example I and, in addition, was optically sensitized to confer sensitivity to green light. The emulsion was divided into 2 parts and ingredients as listed in the table below were added to the emulsions which were then coated and dried. Exposure and development in a lithographic type developer gave the following results.

| Sample No. | Grams/1.5 moles AgX sodium dodecyl sulfate | 100 grams of polymer latex per 1.5 moles of silver halide | Relative speed | Average gradient | Fog | Halftone dot quality [1] |
|---|---|---|---|---|---|---|
| 1 (Control) | 3.58 | (A) | 177 | 17.8 | .06 | 1 |
| 2 | 3.58 | Phosphate ester polymer dispersion. | 173 | 17.2 | .06 | 1 |

[1] A designation of 1 indicates a subjective judgment of dot quality as being excellent.

The use of the polymer dispersion of this invention containing the phosphate ester described under Procedure for Making the Polymer Dispersions gave sensitometric results which were comparable with a polymer dispersion which could be used in this emulsion but which causes a severe loss of speed in panchromatically sensitized emulsions as shown in the following example.

*Example III.*—A gelatino-silver iodobromide emulsion was made as described in Example I except that it was panchromatically sensitized with a mixture of:

9-methyl thiacarbocyanine ethiodide and
5,5′,9-trimethyl thiacarbocyanine ethiodide.

The emulsion was divided into two portions and adjuvants as indicated in the following table were added before coating. The films were exposed through red, green and blue filters as is conventional in testing color separation films.

| Adjuvant | Grams of polymer latex per 1.5 moles silver halide | Relative speeds | | |
|---|---|---|---|---|
| | | Red [1] | Green [2] | Blue [3] |
| Polymer latex (A) | 100 | 29 | 29 | 41 |
| Polymer dispersion using phosphate ester as described under procedure A | 100 | 107 | 107 | 107 |
| Polymer Latex B (control) | 100 | 100 | 100 | 100 |

[1] Wratten No. 25 for red exposure.
[2] Wratten No. 58 for green exposure.
[3] Wratten No. 47 for blue exposure.

As will be seen, the use of Polymer latex (A) where sodium dodecyl sulfate is used as a surfactant in conjunction with ammonium persulfate as an initiator causes a large desensitization effect. The polymer dispersion using the same acrylic ester monomer but using the phosphate ester mixture of this invention and azo-bis-isobutyramidine hydrochloride as an initiator as described in the Procedure for Making the Polymer Dispersions showed no desensitizing effect or other detrimental sensitometric effects.

*Example IV.*—A panchromatic emulsion of the type used in Example III was prepared and divided into 4 portions. To portion 1 there was added per 1.5 moles of silver halide, 100 grams of a polymer latex made according to the above procedure but using α,α′-azobisisobutyronitrile as the initiator. To portion 2 there was added 100 grams of a polymer latex made according to the above procedure for making the polymer dispersions using α,α′-bisisobutyramidine hydrochloride as the polymerization initiator. To portion 3 there was added 100 grams of Polymer later (A) identified above and to portion 4 there was added 100 grams of Polymer latex B identified above. The sensitometric results are shown in the following table.

ROOM CONDITIONS

| Portion No. | Relative speed | Average gradient | Fog |
|---|---|---|---|
| 1 | 257 | 2.05 | .04 |
| 2 | 219 | 1.95 | .03 |
| 3 | 81 | 2.25 | .04 |
| 4 | 225 | 2.14 | .03 |

It will be seen that the addition of the Polymer latex (A) which uses sodium dodecyl sulfate as the surfactant and ammonium persulfate as the initiator to the emulsion caused a serious loss of speed due to desensitization and that portions 1 and 2 are substantially equivalent with portion 4 which contains the Polymer latex B which can be used with panchromatically sensitized emulsions which are used for color separation negatives.

While the above polymeric dispersions are made using ethyl acrylate as the vinyl monomer, the invention is by no means limited to this monomer. Considerable latitude is possible in the choice of the polymeric dispersion used. A preferred class of polymers are the alkyl acrylates and methacrylates, e.g., polymers and copolymers of methyl, ethyl, butyl, ethylhexyl acrylate and methyl and butyl methacrylate. In addition, acrylic acid can be used in the preparation of the copolymers provided no more than 10 mole percent of such acid is used in the polymerization with other constituents. Other useful classes of vinyl monomers used to prepare the polymeric and copolymeric dispersions are the vinyl esters such as acetate, propionate, etc., the vinyl and vinylidene halides such as vinylidene chloride, styrene and substituted styrenes; the dienes such as butadiene; and acrylonitrile.

In general, best results are obtained with vinyl monomers which yield the lowest water sensitivity and the lowest modulus of elasticity. Thus the acrylates will generally be preferable to methacrylates and polyethylene to polyvinylidene chloride polymers and copolymers.

A critical characteristic of the dispersion is the particle size since the intended application requires freedom from light scattering. Particle size may be controlled by techniques of emulsion polymerization known in the art such as the use of adequate concentration of surfactants, the mode of stirring, the concentration of reactants, temperature, rate of addition of monomers, etc. For most applications, particle sizes below 100 m$\mu$ are desirable, but for less critical uses particle sizes up to 1$\mu$ are permissible.

Although the preferred emulsions of this invention contain silver halide grains of either silver iodobromide or silver bromochloride, the invention is not limited thereto. Some of the advantages, e.g., dimensional stability, freedom from sensitometric variations, aging stability, etc., may be realized in aqueous gelatin emulsions containing other types of silver halide grains, e.g., bromide, iodochloride, etc., and mixtures thereof such as are used in cine negative, radiographic, microfilm, recording and astronomical films.

The aqueous gelatin emulsions useful in the invention may be prepared by standard precipitation, washing, sensitization and digestion operations or by precipitating with organic solvents or preferably by water-soluble, acid-soluble organic polymer of the types disclosed in Moede, U.S. Patent 2,772,165.

The present invention is not limited to the use of a particular film base support as the emulsions may be coated on various films and plates composed of glass, metal, paper, cellulose derivatives, e.g., cellulose acetate, propionate and butyrate, superpolymers, e.g., nylon, polyvinyl chloride poly(vinyl chloride co-vinyl acetate), styrene, polymethylene terephthalates, polycarbonates, e.g., the polycarbonate of 2,2-bis-p-hydroxyphenyl propane, polyethylene terephthalate/isophthalate,, etc. Of course, various sub-layers may be present to anchor the layer to the base as is common in the art of photographic film manufacture. A suitable example is the vinylidene chloride copolymer coated supports of Alles et al., U.S. Patent 2,627,088. Also, various other auxiliary layers may be employed such as antiabrasion layers and antihalation backing or undercoat layers.

The emulsions may be modified by the addition of general emulsion sensitizers, e.g., alkyl thiourea, phenylisothiocyanate, sodium thiosulfate and alkyl isothiocyanate; metal compounds, e.g., of gold, platinum, palladium iridium, rhodium, etc., antifogging agents, e.g., 2- mercaptobenzothiazole 1-phenyl-5-mercapto-tetrazole, benzotriazole, triazindenes, tetrazindenes, and 5-nitro-benzimidazole; sensitizing dyes, e.g., cyanine, carbocyanine, pseudocyanine, merocyanine and styryl dyes; hardeners, e.g., formaldehyde, glutaraldehyde, and glycol aldehyde, dimethylol urea, trimethylol melamine, chrome alum and other emulsion adjuvants.

The novel emulsions of this invention are useful in the manufacture of lithographic photographic films possessing improved physical properties, improved edge sharpness of halftone dots, and sensitometric properties.

The embodiments of the invention in which an exclusive property or privilege is claimed are defined as follows:

1. A photographic silver halide emulsion having as the film-forming binding material for the silver halide grains a mixture of gelatin and an aqueous dispersion of polymerized vinyl compound dispersed with a mixture of organic phosphates, said mixture comprising, by weight, 100% to 85% of

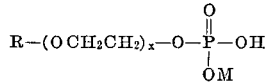

and 0 to 15% of

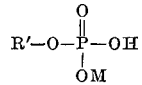

wherein R is a branched chain nonylphenyl group, $x$ is an integer no greater than 6, R' is an alkyl radical of 10 to 12 carbon atoms, and M is hydrogen, alkali metal, or ammonium, and a free-radical azo addition polymerization initiator, said mixture containing 40 to 180 parts of gelatin and 10 to 90 parts of polymerized vinyl compounds, by weight for each mole of silver halide.

2. An emulsion according to claim 1 wherein said polymerized vinyl compound is an arcylic acid ester selected from the group consisting of a homopolymer of an acrylic acid ester, a homopolymer of an alpha-hydrocarbon substituted acrylic acid ester, and a copolymer of said acrylic acid esters wherein said copolymer contains at least 90% by weight of units of said acrylic acid esters.

3. An emulsion according to claim 1 wherein said silver halide emulsion is a panchromatic silver iodobromide emulsion.

References Cited
UNITED STATES PATENTS

| | | | |
|---|---|---|---|
| 2,853,471 | 9/1958 | Beadell | 260—29.6X |
| 3,142,568 | 7/1964 | Nottorf | 96—87 |
| 3,244,657 | 5/1966 | Grosser et al. | 260—29.6UX |
| 3,258,338 | 6/1966 | Claeys et al. | 96—67 |
| 3,300,423 | 1/1967 | Brown et al. | 260—29.6UX |
| 3,449,282 | 6/1969 | Lasher et al. | 260—29.6 |

WILLIAM D. MARTIN, Primary Examiner

H. J. GWINNELL, Assistant Examiner

U.S. Cl. X.R.

96—114.5